United States Patent
Ojanen et al.

(10) Patent No.: US 8,054,060 B2
(45) Date of Patent: Nov. 8, 2011

(54) CONFIGURABLE FEED-FORWARD CIRCUIT FOR A POWER SUPPLY

(75) Inventors: Martti Ojanen, Turku (FI); Hannu Virta, Paimio (FI)

(73) Assignee: Nokia Coporation, Espoo (FI)

( * ) Notice: Subject to any disclaimer, the term of this patent is extended or adjusted under 35 U.S.C. 154(b) by 865 days.

(21) Appl. No.: 12/076,416

(22) Filed: Mar. 18, 2008

(65) Prior Publication Data

US 2009/0200996 A1    Aug. 13, 2009

(30) Foreign Application Priority Data

Feb. 12, 2008  (FI) .................................... 20085124

(51) Int. Cl.
  *G05B 11/10*  (2006.01)
(52) U.S. Cl. .................. 323/351; 323/299; 323/354
(58) Field of Classification Search .............. 323/351, 323/352–354, 299; 700/40
  See application file for complete search history.

(56) References Cited

U.S. PATENT DOCUMENTS

| | | | | |
|---|---|---|---|---|
| 5,744,944 A * | 4/1998 | Danstrom | .................. | 323/284 |
| 6,930,520 B2 * | 8/2005 | Solie | .................. | 327/131 |
| 7,352,210 B2 * | 4/2008 | Luo | .................. | 326/82 |
| 7,688,050 B2 * | 3/2010 | Schiff et al. | .................. | 323/276 |
| 2006/0186952 A1 * | 8/2006 | Lou et al. | .................. | 327/553 |
| 2007/0035259 A1 * | 2/2007 | Wang et al. | .................. | 315/307 |
| 2007/0035280 A1 * | 2/2007 | Fujiyama et al. | .................. | 323/212 |

* cited by examiner

*Primary Examiner* — Harry Behm
(74) *Attorney, Agent, or Firm* — Squire, Sanders & Dempsey (US) LLP

(57) ABSTRACT

A switched mode power supply unit realized by an integrated circuit comprising a control circuit controlling the operation of the switched mode power supply unit, wherein the control circuit is configured to provide a plurality of different circuit configurations for different operating environments. The circuit configuration for the control circuit is defined by a control signal received by the control circuit.

27 Claims, 2 Drawing Sheets

CONFIGURABLE FEED-FORWARD CIRCUIT FOR A POWER SUPPLY

FIELD OF THE INVENTION

The invention relates to field radio telecommunications and, particularly, to controlling the power supply in a radio transmitter.

BACKGROUND OF THE INVENTION

Switched mode power supplies (SMPS) are widely used to supply voltages in applications such as televisions, freestanding mains adaptors, but also mobile communication devices. A conventional SMPS unit comprises a feedback loop, which controls a power transistor stage to produce the desired output voltage. The feedback loop controls, for example, a duty cycle of the power transistor stage. The SMPS unit additionally comprises a compensation network comprising a circuitry, which optimises the performance of the SMPS unit and enables the SMPS unit to have good linearity and stability properties.

The SMPS unit is typically implemented as a single integrated circuit in which case the characteristics of the compensation network are fixed but the output voltage may be changed adaptively. In such cases, the SMPS unit is dedicated to a given application. To provide the SMPS unit with more flexibility, the integrated circuit is provided with additional pins to which external tuning components may be attached. This is, however, a very cumbersome solution and limits the usability of such an SMPS unit in applications where different signal responses are needed for instance in an amplitude signal path of a radio transmitter based on envelope elimination and restoration (EER) architecture and/or in some other general applications experiencing variable load conditions. Furthermore, tuning the SMPS unit with external components increases the costs but also, from the electrical performance point-of-view, the sensitivity to noise.

SUMMARY OF THE INVENTION

According to an aspect of the present invention, there is provided an apparatus including a switched mode power supply. The switched mode power supply includes a control circuit configured to receive a control signal and control the operation of the switched mode power supply. The control circuit is configured to provide a plurality of different circuit configurations for different operating environments and a circuit configuration of the plurality of different circuit configurations for the control circuit is defined by the received control signal.

According to another aspect of the present invention, there is provided a method that includes determining an operating environment of a switched mode power supply. The switched mode power supply includes a control circuit controlling the operation of the switched mode power supply. The control circuit is configured to provide a plurality of different circuit configurations for different operating environments. The method also includes selecting a circuit configuration of the control circuit according to the operating environment of the switched mode power supply and configuring the control circuit to apply the selected circuit configuration.

According to yet another aspect of the present invention, there is provided a computer program embodied on a computer-readable medium, the program causing a processor to determine an operating environment of a switched mode power supply. The switched mode power supply includes a control circuit controlling the operation of the switched mode power supply. The control circuit is configured to provide a plurality of different circuit configurations for different operating environments. The program further causes the processor to select a circuit configuration of the control circuit according to the operating environment of the switched mode power supply and to configure the control circuit to apply the selected circuit configuration In another aspect, the controller is configured to determine an operating environment of the switched mode power supply, to select the circuit configuration for the control circuit according to the operating environment of the switched mode power supply and to apply to the control circuit the control signal defining the selected circuit configuration.

In another aspect, the operating environment includes a load condition of the switched mode power supply and the controller is further configured to determine the load condition of the switched mode power supply and to select the circuit configuration for the control circuit according to the load condition of the switched mode power supply.

In another aspect, the operating environment includes an operational mode of the switched mode power supply and the controller is further configured to determine the operational mode of the switched mode power supply and to select the circuit configuration for the control circuit according to the operational mode of the switched mode power supply.

In another aspect, the operating environment includes a supply voltage mode of the switched mode power supply and the controller is further configured to determine the supply voltage mode of the switched mode power supply and to select the circuit configuration for the control circuit according to the supply voltage mode of the switched mode power supply.

In another aspect, the control circuit includes a feedback control circuit arranged at a feedback loop of the switched mode power supply and the circuit configuration of at least the feedback control circuit is defined by the received control signal.

In another aspect, the configuration of the feedback control circuit defines at least one of a gain and a frequency response of the feedback control circuit.

In another aspect, the control circuit includes a feed-forward control circuit arranged at a feed-forward line of the switched mode power supply and the circuit configuration of at least the feed-forward control circuit is defined by the received control signal.

In another aspect, the configuration of the feed-forward control circuit defines one or more reference voltages that control a voltage ramp generator of a duty cycle generator of the switched mode power supply.

In another aspect, the configuration of the feed-forward control circuit defines an open-loop gain response of the switched mode power supply.

In another aspect, the control circuit includes one or more switches configured to select and deselect predetermined components of the control circuit to define the configuration of the control circuit, wherein the switches are controlled by the received control signal.

In still another aspect, the control circuit includes a plurality of circuit configurations and the one or more switches are configured to select one of the circuit configurations to define a current circuit configuration of the control circuit.

BRIEF DESCRIPTION OF THE DRAWINGS

Embodiments of the present invention are described below, by way of example only, with reference to the accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The embodiments of the invention are described below with the assumption that one skilled in the art has knowledge about the general structure and elements of a conventional radio transmitter, e.g. a mobile communication device, and the operation of a switched mode power supply (SMPS) unit.

Figure 1:
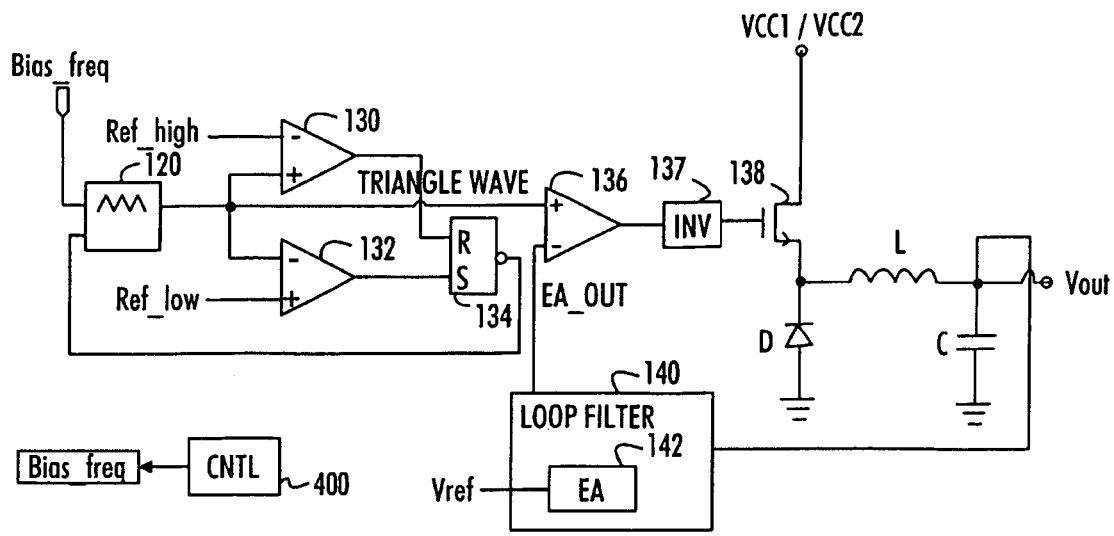
FIG. 1 illustrates a non-synchronous switching based on buck regulator topology.

FIG. 1 illustrates an example of a very basic scenario of a SMPS based on non-synchronous buck, i.e. step-down, regulator topology. The SMPS may be utilized in a radio transmitter for providing a power amplifier with supply voltage. In FIG. 1, comparators 130, 132 set and reset a flip-flop 134 according to respective reference voltages Ref_high and Ref_low input in the comparators 130 and 132 and according to a triangular signal waveform received from a ramp generator 120. An output of the flip-flop 134 controls high and low level turn points of the ramp generator 120 which is configured to output the signal having a triangular waveform. In more detail, the ramp generator 120 adjusts rising and falling slopes of the triangular wave according to a control signal received from the flip-flop 134. The triangular wave output by the ramp generator 120 is then applied to a duty cycle generator 136, which is configured to provide a control signal controlling a power transistor 138 of the SMPS to switch on and off. In practice, the control signal output by the duty cycle generator 136 is first applied to a driver stage 137 which may comprise an inverter chain to generate enough charge to switch a power transistor 138 on and off according to the control signal. Voltages VCC1/VCC2 denote the operating voltage of the power transistor, and the operating voltage VCC1 or VCC2 may be obtained from a battery or from a boost converter, for example. The power transistor may be an n-channel enhancement type of MOSFET.

A power diode D is non-synchronous (free-running) in this example, so it does not need any control. A combination of an n-MOS power switch (the power transistor 138) and the diode D can be replaced with a so called synchronous power switch stage composed of two power switches, for instance two n-channel types of power switches, to represent a more advanced and efficient stage than that in FIG. 1. Such a synchronous power switch stage is usually implemented in the case of an integrated SMPS when totally integrated structures are carried out. The power switches used in the synchronous power stage may also be of other types than n-types of switches, such as p-type switches or a combination thereof. From the point of view of technology, they can be other MOS, bipolar, GaAs or any suitable electrical high current switches.

The duty cycle of the control signal generated by the duty cycle generator 136 is controlled by the triangular wave but also by an error signal EA_OUT input in the duty cycle generator from an error amplifier 142 located at a feedback loop of the SMPS. The error amplifier 142 may be configured to monitor a feedback signal of the SMPS with a reference voltage Vref and output the error signal EA_OUT accordingly. In other words, the error amplifier 142 ensures that the output voltage of the SMPS follows the reference voltage Vref, which becomes multiplied by 1+Ra/Rb. The reference voltage Vref may be fixed, or it can be variable with slowly or rapidly changing high-/low-level signal properties.

The output voltage of the power transistor 138 is applied to an energy storage comprising a coil L and a capacitor C. The energy storage sets large-signal properties for the SMPS. The energy storage functions also as a low-pass filter to smooth the output of the power transistor 138. The coil L is arranged in series in the circuit and the capacitor C is connected to the ground at the other end to provide the second-degree low-pass properties. The components L and C may be replaced for different operational environments but, in order to ensure stable operation of the SMPS, other parts of the SMPS may have to be changed to adapt the SMPS circuitry to the new energy storage. The output voltage Vout of the SMPS is obtained from the energy storage components L and C and applied to a load of the SMPS (a power amplifier in a radio transmitter structure, for instance). The output of the SMPS is connected also to a feedback loop of the SMPS. The feedback loop includes a loop filter 140 comprising the error amplifier 142, and the feedback loop is connected at the other end to the negative input of the duty cycle generator 136. The loop filter 140 may include a compensation network stabilizing the response of the regulator, wherein the compensation network may be configurable according to embodiments of the invention.

When implemented in the radio transmitter, the SMPS is often used as a power supply unit to provide a power amplifier with power supply voltage. In a multi-mode radio transmitter, the power amplifier has multiple operational modes, e.g. linear and saturated mode, and properties depending on transmission band and transmission power, for example. Since the power amplifier functions as a load for the SMPS, different operational states of the power amplifier affect also the operation of the SMPS when considering the overall performance. Additionally, the SMPS may be driven directly from a battery or through a boost converter depending on the required output power levels of the SMPS. A cascaded configuration may be provided for the SMPS, wherein the battery supplies the boost converter, and the boost converter supplies the buck converter of the SMPS. When the SMPS is driven directly from the battery, the boost converter may be bypassed. If the cascaded configuration of the power converters is used, then bypassing the first converter (the boost converter) increases overall efficiency at certain power levels but at very low power levels it might provide even better efficiency to disable the boost converter totally. In such a case, a body diode of the boost converter (including a series N-type lateral double diffused with drain extension metal-oxide switch transistor, NLDEMOS) is used to supply input voltage to input or inputs of the buck converter. Varying load conditions and supply voltage modes affect the performance of the SMPS and may cause undesired peaking of group delay in case of an envelope elimination and restoration transmitter architecture in which the SMPS is located on an amplitude path of a transmission signal, while a phase component of the transmission signal is conveyed through another path.

According to an embodiment of the invention, an operating environment of SMPS may be determined, and a circuit configuration for a control circuit of the SMPS is selected according to the operating environment. The operating environment of the SMPS may include at least one of load condition and operational mode of the SMPS. The control circuit of the SMPS may include a feedback circuit including the loop filter and a feed-forward circuit including a ramp generator control circuit. The determination and the configuration may be carried out by a controller of a multi-mode terminal of a mobile telecommunication system. The controller may be implemented by a digital signal processor (DSP) or a main co-processor/microcontroller unit (CPU) driven by software. The controller may monitor the operating environment of the SMPS and select a circuit configuration most optimal for each operating environment. The controller may monitor the load condition and/or the operational mode of the SMPS and check a memory unit for a circuit configuration matching the current load condition and/or operation mode. The load condition may include an operational mode of a power amplifier of the radio transmitter. The operational mode of the SMPS may include an input voltage mode of the SMPS, e.g. whether the SMPS is driven from a battery, boost converter, or from another voltage source. Then, the controller may be configured to apply, to the SMPS, a control signal associated with the circuit configuration read from the memory unit and, as a consequence, configure the SMPS to apply the circuit configuration. Thus, the associated control signal can be controlled by an external controller driven by software, or the controller functionality may be hardware coded into the SMPS. The software can utilize a look-up table to handle different modes of operation. Additionally or alternatively, a conditional control of operational modes may be implemented. When the controller is software-controlled, the control signals controlling the circuit configuration may be sent to the SMPS. Alternatively, the SMPS may be implemented with logic to modify a command which sets an operational mode for a radio frequency integrated circuit and the power amplifier of the transmitter so as to select a correct circuit configuration for the SMPS. In the latter case, the same control signal that sets the operational environment of the SMPS, e.g. the operation mode of the power amplifier, may be used to select a circuit configuration for the SMPS. The optimal circuit configurations for different load conditions and/or operational modes may be defined during a manufacturing and/or testing phase of the SMPS and stored in the memory unit.

In an embodiment, the SMPS is realized by a single integrated circuit having different circuit configurations from which a currently applied circuit configuration may be selected with an external control signal. Accordingly, a need for external tuning circuit components and, thus, the presence of external noise are avoided, thereby achieving a cost-efficient and efficient implementation. Noise caused by switching frequency may also be attenuated with this type of configurability. The control signal may be a digital control signal controlling one or more switches in the SMPS circuitry. Accordingly, minimal noise is induced to the SMPS from an input interface configured to receive the control signal.

Figure 2:
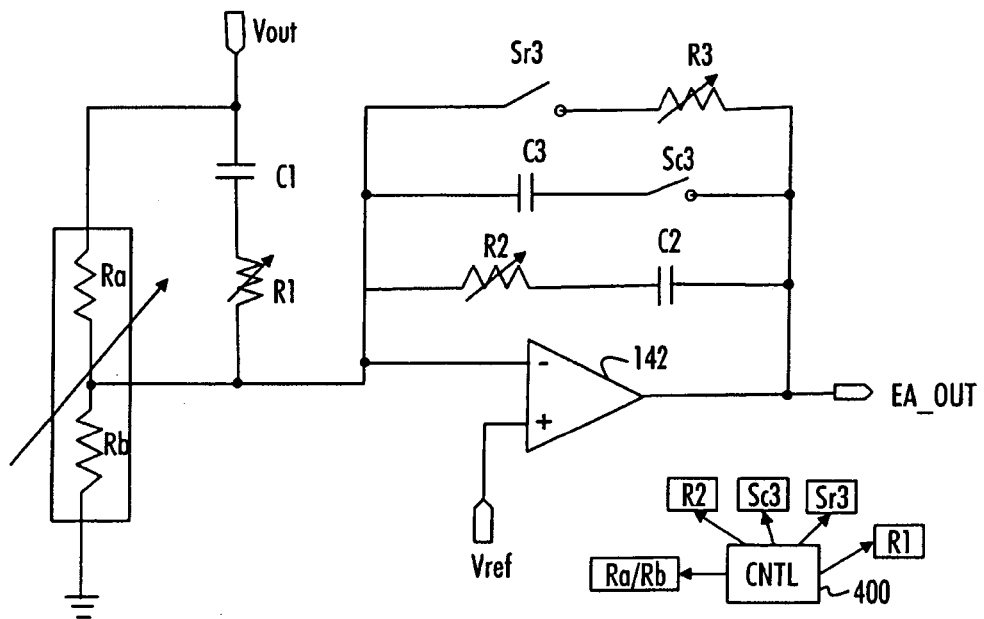
FIG. 2 illustrates a feedback control circuit providing a plurality of circuit configurations according to an embodiment of the invention.

FIG. 2 illustrates an embodiment of a feedback control circuit of the SMPS, wherein the feedback control circuit includes a PID-type of control circuit (proportional-integral-derivative controller). Other types of control circuits (P, PI, PD) are also possible. The feedback control circuit may include the loop filter 140 of the SMPS as well as the error amplifier 142. As can be seen in FIG. 2, the feedback control circuit includes a plurality of components having their parameter values tunable to obtain the desired response for different operating environments of the SMPS. Input signal Vout of the feedback control circuit is the feedback signal obtained from an output of the SMPS, and an output signal EA_OUT of the feedback control circuit is applied to the duty cycle generator 136, as described above.

The feedback control circuit of FIG. 2 may include at least a part of a compensation network of the SMPS. In the feedback circuit of FIG. 2, a first resistor R1 and a first capacitor C1 represent a lead compensator part, and a second resistor R2 and a second capacitor C2 represent a lag compensator part. A DC (direct current) voltage gain of the SMPS, i.e. a ratio between the reference voltage Vref and SMPS output voltage (or Vout) is set via a pair of tunable resistances Ra and Rb. In an embodiment, the absolute values of the resistances may be tuned according to the operating environment of the SMPS but a ratio of the resistances Ra and Rb may be kept constant. In another embodiment, the ratio of the resistances Ra and Rb may be tuned in addition to their absolute resistance values, thereby tuning the DC voltage gain of the SMPS. The values of the resistances R1, R2, Ra, and Rb may be tuned in order to tune a loop filter gain and frequency response of the feedback control circuit. The loop filter gain and frequency response of the feedback control circuit may be set according to the operating environment of the SMPS so as to enable stable performance of the SMPS in different operating environments and whenever fast response times are needed. The loop filter gain response may be tuned, for example, according to an operational mode of the power amplifier acting as a load for the SMPS. Different resistance values for resistors R1, R2, Ra, and Rb, i.e. different loop filter gain responses, may be defined for different operational modes of the power amplifier. The tunable resistors R1, R2, Ra, and Rb (and tunable resistors in other embodiments) may be seen as resistor circuits, wherein the absolute resistance value may be selected as described later with reference to FIG. 4. Obviously, capacitive elements C1, C2 and C3 may be provided with tuning capability.

A third resistance R3 and a third capacitor C3 define an element of the feedback control circuit, which shunts the loop filter gain on a frequency band defined by the values of the third resistance R3 and the third capacitor C3. Switches Sr3 and Sc3 may be closed in order to carry out the shunting. Additionally, a resistance value of the third resistance R3 may be tuned for different environments in which the shunting is performed. For example, consider a case where a switching frequency of the SMPS is decreased in order to improve efficiency. Typically, the switching frequency is significantly higher than 0 dB frequency of the loop filter so that switching ripple noise does not cause instability. Now that the switching frequency is decreased in order to improve the efficiency, the switching ripple noise may appear on a 0 dB band of the loop filter, thereby causing an increased noise level. With the shunting function according to this embodiment, the 0 dB frequency of the loop filter may be decreased to prevent the switching ripple noise from affecting the performance of the SMPS. Enabling the shunting, i.e. closing the switches Sr3 and Sc3, may, however, decrease a phase margin of the loop filter. Accordingly, the resistance value of also the second resistor R2 may be tuned when the shunting is activated in order to sustain the original phase margin.

The tunability of the resistors R1, Ra, and Rb may also include a possibility to disconnect the resistors R1, Ra, and Rb from the feedback control circuit in order to open the feedback loop and achieve an open loop configuration for the SMPS. Such a configuration can be used in a mass-production testing phase, for instance. As another example, such a configuration may be used when the properties of the energy storage (including components L and C) are changed significantly and acceptable performance is achievable with a lower LC time constant than the original one, while sustaining good line transient suppression properties. The feedback control circuit may then be directly controlled digitally, for instance via a resistor ladder network to the positive input of the error amplifier 142 in a binary-coded manner. Alternatively, the feedback control circuit may be controlled in an analog manner, e.g. by a D/A converter to the positive input of the error amplifier 142. When maximal efficiency improvement is needed, the feedback control circuit may be bypassed completely, and the power transistor stage can be controlled directly in an open-loop configuration by a digital pulse width modulated signal. In this circuit configuration, the third resistance R3 may be tuned to have a low resistance value. In this case, a voltage buffer comprising the error amplifier 142 and components C3, R3, C2, and R2 control the duty cycle generator 136 directly while allowing a good line transient rejection due to the feed-forward structure of the SMPS. In an embodiment of the open loop configuration, only the LC low-pass filter is arranged at the output of the SMPS and the pulse width modulator in the input of the power transistor stage.

In case the SMPS is implemented as a discrete-time SMPS application, the feedback control circuit of FIG. 2, i.e. the compensation network and the error amplifier, may be replaced with an analog-to-digital sigma-delta modulator, and the configurability of the SMPS control circuit for different operating environments may be implemented by switched capacitor circuits controlled according to the operating environment of the SMPS. Alternatively, a digital SMPS can be used as arranged in a DSP or CPU chip and having its parameters processed in a digital signal processing domain.

Figure 3:
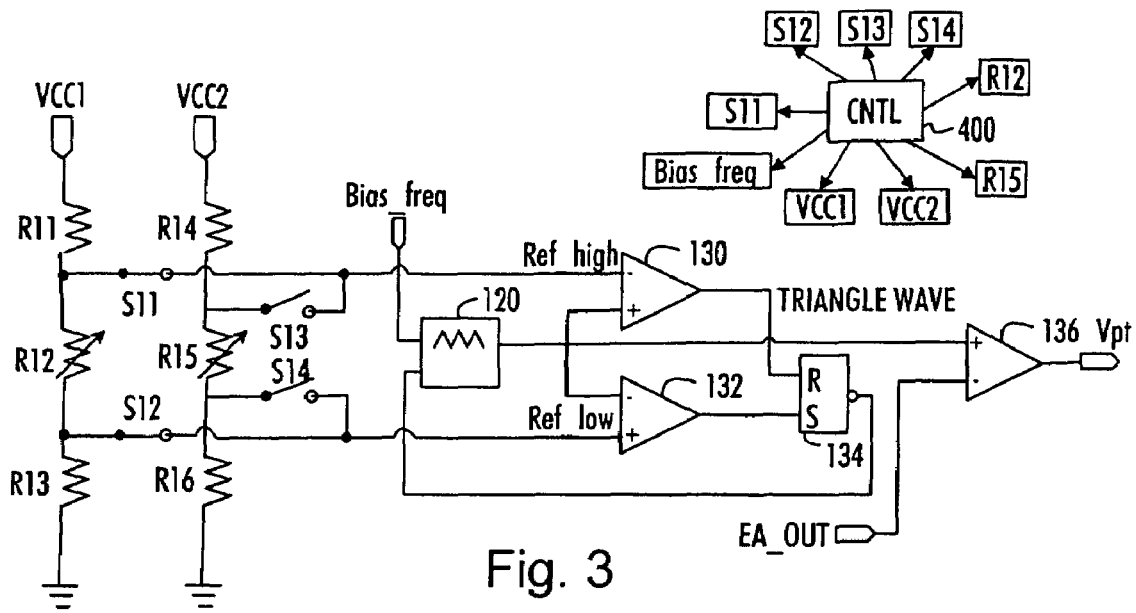
FIG. 3 illustrates a feed-forward control circuit providing a plurality of circuit configurations according to an embodiment of the invention.

FIG. 3 illustrates a feed-forward control circuit arranged at a feed-forward line of the SMPS. The components denoted by the same reference numerals as in FIG. 1 represent similar components. Referring to FIG. 3, voltage VCC1 represents a voltage supplied to the feed-forward control circuit when the SMPS is provided with a supply voltage from the battery, while voltage VCC2 represents a voltage supplied to the feed-forward control circuit when the SMPS is provided with a supply voltage from another source, e.g. a boost converter. VCC1 may have a lower voltage value than VCC2. VCC1 or VCC2 may be input from real power sources, e.g. from the battery or from the boost converter. When a supply voltage mode of the SMPS is changed in order to optimize the efficiency of the SMPS, the SMPS may be supplied directly from the battery. Simultaneously, reference voltages Ref_high and Ref_low of the ramp generator 120 may be changed in order to maintain good reference signal linearity at the output of the ramp generator 120 and to keep a feed-forward gain of the SMPS constant. Accordingly, switches S11 and S12 are closed and switches S13 and S14 are opened in order to select voltage VCC1. The SMPS may be supplied with voltage directly from the battery when power level requirements of the power amplifier are low, for example.

On the other hand, when the SMPS is required to supply high power levels, the SMPS may be supplied with voltage from the boost converter and, again, reference voltages Ref_high and Ref_low of the ramp generator 120 may be changed in order to maintain good reference signal linearity at the output of the ramp generator 120 and to keep a feed-forward gain of the SMPS constant. Accordingly, switches S13 and S14 are closed and switches S11 and S12 are opened in order to select voltage VCC2.

It is also beneficial to have these switches S11 to S14 controlled in an automatic manner according to the supply voltage mode of the SMPS. In practice, when the supply voltage mode of the SMPS is changed, e.g. the boost converter at the previous stage is set to a bypass state, the feed-forward control circuit may also be adjusted simultaneously to switch between the VCC1 and VCC2 in order to keep maximum linearity upon the occurrence of the change of the supply voltage mode. The controller may apply, to the switches S11 to S14, an appropriate control signal upon detection of the change in the supply voltage mode in order to select an appropriate input node VCC1 or VCC2 so that a correct feed-forward control circuit is selected.

Tunable resistors R12 and R15 are used to control a swing factor of the ramp generator 120. In other words, values of the resistances tune the open-loop gain response of the SMPS. Accordingly, the values for the tunable resistors may be selected in order to attenuate the closed-loop ripple voltage in a pass-band of the SMPS, i.e. to prevent group delay from peaking when the SMPS is arranged at the amplitude signal path in the envelope elimination and restoration (EER) type of radio transmitter architecture, for instance. Values of resistances R11, R13, R14, and R16 may be fixed. A frequency control signal Bias_freq affects the switching frequency of the SMPS, and the frequency control signal may also be tuned according to the operating environment of the SMPS.

Figure 4:
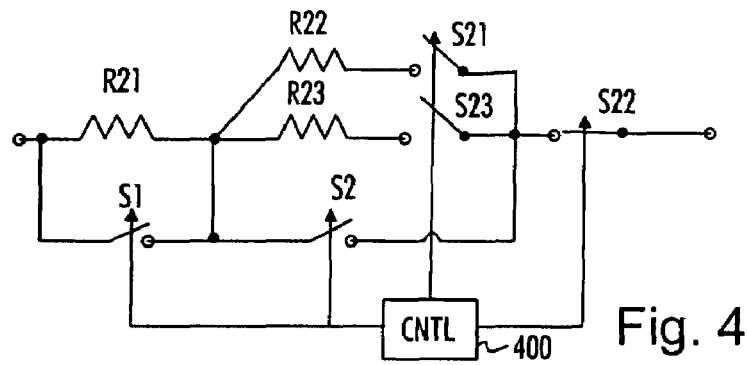
FIG. 4 illustrates a resistor circuit providing multiple configurations.

FIG. 4 illustrates an exemplary structure for a tunable resistor, which may be any one of the tunable resistors Ra, Rb, R1, R2, R3, R12, and R15 illustrated in FIGS. 2 and 3. In a general level, these resistances can be replaced with impedances so that selected impedances can be handled in the corresponding manner for tuning purposes. Accordingly, the tunable resistors Ra, Rb, R1, R2, R3, R12, and R15 may each be seen as a resistor circuit. As shown above, the control circuit of the SMPS may include a plurality of circuit configurations and one or more switches may be operated so as to select one of the circuit configurations, thereby defining the current circuit configuration of the control circuit. The plurality of circuit configurations may be arranged to parallel branches so that one of the branches may be selected by closing and opening the switches appropriately. Referring to FIG. 4, the tunable resistor includes a plurality of selectable configurations from which one configuration may be selected by operating switches S1, S2, S21, S22, and S23. The switches S1, S2, S21, S22, and S23 are controlled by control signals received from a controller 400 through the input interface of the SMPS. The circuit in FIG. 4 provides four different configurations when switches S1 and S2 are open: a disconnection by opening switch S22, a configuration with resistor R22 selected, a configuration with resistor R23 selected, and a configuration with both resistors R22 and R23 selected. Moreover, the circuit is shortcut when S1, S2 and S22 are closed, but only R22 and R23 are shortcut when S2 and S22 are closed. Then, a case where S1 and S22 are closed (while S2 is open) provides the above-described combinations of R22 and R23. In general, each parallel configuration may include one or more components having values specifically designed for a given operating environment. The controller 400 may control the switches S1, S2, S21, S22, and S23 with a binary control word, wherein one bit is directed to each switch S1, S2, and S21 to S23, thereby effectively opening or closing each one of the switches S1, S2, and S21 to S23. Referring to FIG. 2, resistors Ra, Rb, and R1 may include the possibility to disconnect the resistor from the control circuit of the SMPS. Additionally, switch Sr3 may be included in the third resistor R3 in a similar manner.

Figure 5:
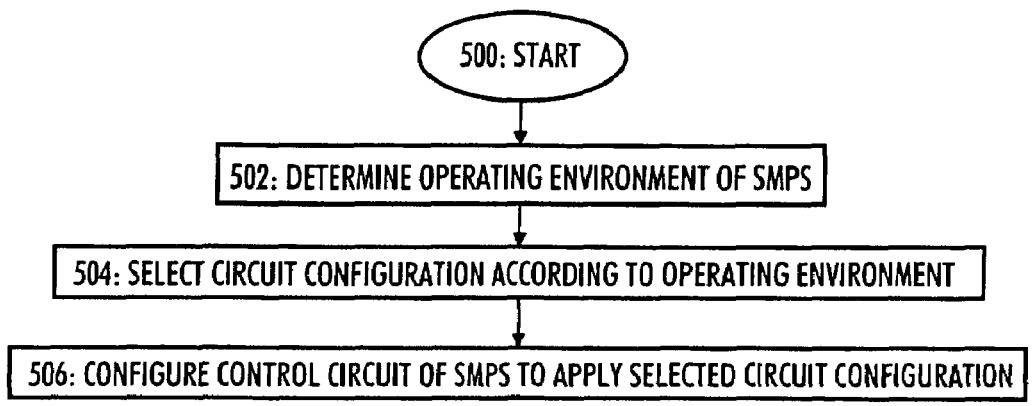
FIG. 5 is a flow diagram illustrating a process for configuring a control circuit of a switched mode power supply according to an embodiment of the invention.

Let us now describe the operation of the controller 400 configured to select a circuit configuration for the control circuit of the SMPS according to the operating environment of the SMPS. The operation of the controller is described with reference to FIG. 5 illustrating a flow diagram of a process for controlling the SMPS. The process may be carried out as a computer process in the controller 400. The computer process may be embodied in a computer-readable medium from which the controller 400 may read the computer process so as to execute it. The process starts in block 500.

In block 502, the controller determines the operating environment of the SMPS. The controller may determine, for example, a load condition and/or operational mode of the SMPS. The load condition may include an operation mode of the power amplifier, for instance. That is, the controller may determine whether the power amplifier is driven in a linear mode, in a saturated mode or whether the power amplifier acts as a sinking source (in case of wideband code division multiple access transmission, for example). Alternatively (or additionally), the load condition may include operational parameters of the power amplifier, such as a current operational bandwidth and power consumption of the power amplifier. The change in the load condition may set new requirements for the gain, bandwidth, and frequency response of the SMPS but also for its switching frequency, for instance. The operational mode of the SMPS may include a supply voltage mode of the SMPS, i.e. whether the SMPS is supplied with voltage from a battery or from another source, such as the boost converter. When the SMPS is supplied directly from the battery, the pre-regulator, e.g. the boost converter, arranged between the battery and the SMPS may be set to a bypass mode or even disabled. In such a case, the SMPS may have a single input supply voltage node. In another embodiment, the SMPS has a plurality of selectable supply voltage input nodes and correspondingly separate switches for each one of the input nodes. One node may be connected to the battery while the other nodes may be connected to other input supply voltage sources.

In practice, a memory unit may store information on the current operational mode of the SMPS and/or the power amplifier, because different power amplifiers may require different settings for the SMPS. It is also obvious that changing external low-pass LC partitioning may require changing the functional mode of the SMPS. Firstly, the LC partitioning may be changed manually, and then the controller may also be configured manually to accommodate the new LC partitioning. Alternatively, a plurality of parallel LC configurations may be provided in the SMPS, wherein a given LC partitioning may be selected with switches controlled by the controller. The switches may be arranged in series in the groundside current loop of each selectable output capacitor.

In case the operating environment includes the bandwidth, operating power, and/or similar operational parameters of the power amplifier or the SMPS itself but also a bias current of the power amplifier, the controller may check such parameters from transmission parameters allocated to the radio transmitter for transmission. The transmission parameters may also be stored in the memory unit.

In block 504, the controller selects a circuit configuration for the control circuit of the SMPS according to the current operating environment of the SMPS. The controller may check a memory unit for a circuit configuration linked to the current operating environment of the SMPS. Accordingly, the memory unit may store a table in which each operating environment of the SMPS is linked to a circuit configuration for use in the particular operating environment. During a design and/or manufacturing phase of the integrated circuit including the SMPS, the control circuit of the SMPS may be arranged to provide a plurality of parallel circuit configurations, wherein each parallel circuit configuration is designed to provide the desired performance of the SMPS in a given operating environment. During the manufacturing and/or testing phase of the integrated circuit, a set of operating environments of the SMPS may be determined and the most suitable circuit configuration available in the SMPS may be selected for each operating environment. Each pair of operating environment and the most suitable circuit configuration for that operating environment may be stored in the memory unit such that they are linked together. Accordingly, the controller is able to select the most suitable circuit configuration in real-time for each operating environment during the operation of the SMPS and the radio transmitter utilizing the SMPS.

In block 506, the controller configures the SMPS control circuit of the SMPS to apply the selected circuit configuration. In practice, the controller may apply, to an input interface of the integrated circuit implementing the SMPS, a binary control word corresponding to the selected circuit configuration. The input interface of the integrated circuit may be part of a serial control bus interface of the SMPS. Each bit of the binary control word may be configured to operate one switch in the control circuit, thereby effectively selecting a circuit configuration for the control circuit of the SMPS.

As mentioned above, the process or method described in FIG. 5 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, an electrical carrier signal, a telecommunications signal, and a software distribution package, for example. Depending on the processing power needed, the computer program may be executed in a single electronic digital processing unit or it may be distributed amongst a number of processing units.

The present invention is applicable to radio transmitters such as user terminals of mobile communication systems. The user terminal utilizing the present invention may be a multi-mode terminal supporting a plurality of different radio communication technologies and, in particular, a plurality of different radio access schemes. The radio access schemes may include GSM-type (Global System for Mobile Communications) of bursty time division multiple access transmission, wideband code division multiple access, and multicarrier transmission schemes, such as orthogonal frequency division multiplexing and single-carrier frequency division multiple access. The technology of such user terminals and mobile communication systems develops rapidly. Such a development may require extra changes to the described embodiments. Therefore, all words and expressions should be interpreted broadly and they are intended to illustrate, not to restrict, the embodiment.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus, comprising:
a switched mode power supply realized by a single integrated circuit configured to produce an output voltage by switching an input voltage on and off according to a duty cycle of a signal produced by a duty cycle generator, the switched mode power supply comprising a control circuit configured to receive a control signal and control the operation of the switched mode power supply, wherein the control circuit is configured to provide a plurality of different circuit configurations for different operating environments, wherein a circuit configuration of the plurality of different circuit configurations for the control circuit is defined by the received control signal, and
wherein the control circuit comprises a feed-forward control circuit, arranged at a feed-forward line of the switched mode power supply, to provide different circuit configurations for different power supply options related to a supply voltage applied to the feed-forward control circuit, and a selection of one of the circuit configurations of at least the feed-forward control circuit and an associated supply voltage mode is defined by the received control signal, and
wherein the control circuit comprises a feedback control circuit arranged at a feedback loop of the switched mode power supply and the circuit configuration of at least the feedback control circuit is defined by the received control signal.

2. The apparatus of claim 1, further comprising:
a controller configured to determine an operating environment of the switched mode power supply, to select the circuit configuration for the control circuit according to the operating environment of the switched mode power supply and to apply to the control circuit the control signal defining the selected circuit configuration.

3. The apparatus of claim 2, wherein the operating environment comprises a load condition of the switched mode power supply and the controller is further configured to determine the load condition of the switched mode power supply and to select the circuit configuration for the control circuit according to the load condition of the switched mode power supply.

4. The apparatus of claim 2, wherein the operating environment comprises an operational mode of the switched mode power supply and the controller is further configured to determine the operational mode of the switched mode power supply and to select the circuit configuration for the control circuit according to the operational mode of the switched mode power supply.

5. The apparatus of claim 2, wherein the operating environment comprises a supply voltage mode of the switched mode power supply and the controller is further configured to determine the supply voltage mode of the switched mode power supply and to select the circuit configuration for the control circuit according to the supply voltage mode of the switched mode power supply.

6. The apparatus of claim 1, wherein the configuration of the feedback control circuit defines at least one of a gain and a frequency response of the feedback control circuit.

7. The apparatus of claim 1, wherein the configuration of the feed-forward control circuit defines one or more reference voltages that control a voltage ramp generator of a duty cycle generator of the switched mode power supply.

8. The apparatus of claim 1, wherein the configuration of the feed-forward control circuit defines an open-loop gain response of the switched mode power supply.

9. The apparatus of claim 1, wherein the control circuit comprises one or more switches configured to select and deselect determined components of the control circuit to define the configuration of the control circuit, wherein the switches are controlled by the received control signal.

10. The apparatus of claim 9, wherein the control circuit includes a plurality of circuit configurations and the one or more switches are configured to select one of the circuit configurations to define a current circuit configuration of the control circuit.

11. A method, comprising:
determining an operating environment of a switched mode power supply realized by a single integrated circuit configured to produce an output voltage by switching an input voltage on and off according to a duty cycle of a signal produced by a duty cycle generator, the switched mode power supply comprising a control circuit controlling the operation of the switched mode power supply, wherein the control circuit comprises a feed-forward control circuit, arranged at a feed-forward line of the switched mode power supply, to provide different circuit configurations for different power supply options related to a supply voltage applied to the feed-forward control circuit;
selecting a circuit configuration of at least the feed-forward control circuit and associated supply voltage mode according to the operating environment of the switched mode power supply; and
configuring the control circuit to apply the selected circuit configuration,
wherein the control circuit comprises a feedback control circuit arranged at a feedback loop of the switched mode power supply, the method further comprising:
selecting the circuit configuration for the feedback control circuit according to the operating environment of the switched mode power supply.

12. The method of claim 11, wherein the operating environment comprises a load condition of the switched mode power supply, the method further comprising:
determining the load condition of the switched mode power supply; and
selecting the circuit configuration for the control circuit according to the load condition of the switched mode power supply.

13. The method of claim 11, wherein the operating environment comprises an operational mode of the switched mode power supply, the method further comprising:
determining the operational mode of the switched mode power supply; and
selecting the circuit configuration for the control circuit according to the operational mode of the switched mode power supply.

14. The method of claim 11, wherein the operating environment comprises a supply voltage mode of the switched mode power supply, the method further comprising:
determining the supply voltage mode of the switched mode power supply; and
selecting the circuit configuration for the control circuit according to the supply voltage mode of the switched mode power supply.

15. The method of claim 11, further comprising:
defining at least one of a gain and a frequency response of the feedback control circuit with the selection of the configuration of the feedback control circuit.

16. The method of claim 11, further comprising:
defining one or more reference voltages used for controlling a voltage ramp generator of a duty cycle generator of the switched mode power supply with the selection of the configuration of the feed-forward control circuit.

17. The method of claim 11, further comprising:
defining an open-loop gain response of the switched mode power supply with the selection of the configuration of the feed-forward control circuit.

18. The method of claim 11, wherein the control circuit comprises one or more switches selecting and deselecting determined components of the control circuit to define the configuration of the control circuit, the method further comprising:
controlling the switches according to the selected circuit configuration.

19. The method of claim 18, further comprising:
selecting one of the circuit configurations by controlling the switches according to the selected circuit configuration to define a current circuit configuration of the control circuit.

20. An apparatus, comprising:
receiving means for receiving a control signal; and
switched mode power supply means for producing an output voltage by switching an input voltage on and off according to a duty cycle of a signal produced duty cycle generator means, the switched mode power supply means comprising control circuit means for controlling the operation of the switched mode power supply means, wherein the control circuit means are configured to provide a plurality of different circuit configurations for different operating environments, and wherein a circuit configuration of the plurality of different circuit configurations for the control circuit means is defined by the received control signal, and
wherein the control circuit means comprises feed-forward control circuit means, arranged at a feed-forward line of the switched mode power supply means, for providing different circuit configurations for different power supply options related to a supply voltage applied to the feed-forward control circuit means, and a selection of one of the circuit configurations of at least the feed-forward control circuit means and an associated supply voltage mode is defined by the received control signal, and
wherein the control circuit means comprises feedback control circuit means arranged at a feedback loop of the switched mode power supply means and the circuit configuration of at least the feedback control circuit means is defined by the received control signal.

21. A computer program embodied on a computer-readable medium, the program causing a processor to perform:
determining an operating environment of a switched mode power supply realized by a single integrated circuit configured to produce an output voltage by switching an input voltage on and off according to a duty cycle of a signal produced by a duty cycle generator, the switched mode power supply comprising a control circuit controlling the operation of the switched mode power supply, wherein the control circuit comprises a feed-forward control circuit, arranged at a feed-forward line of the switched mode power supply, to provide different circuit configurations for different power supply options related to a supply voltage applied to the feed-forward control circuit;
selecting a circuit configuration of at least the feed-forward control circuit and associated supply voltage mode according to the operating environment of the switched mode power supply; and
configuring the control circuit to apply the selected circuit configuration,
wherein the control circuit comprises a feedback control circuit arranged at a feedback loop of the switched mode power supply, the program causing a processor to further perform:
selecting the circuit configuration for the feedback control circuit according to the operating environment of the switched mode power supply.

22. The computer program of claim 21, wherein the operating environment comprises a load condition of the switched mode power supply, the program further causing a processor to perform:
determining the load condition of the switched mode power supply; and
selecting the circuit configuration for the control circuit according to the load condition of the switched mode power supply.

23. The computer program of claim 21, wherein the operating environment comprises an operational mode of the switched mode power supply, the program further causing a processor to perform:
determining the operational mode of the switched mode power supply; and
selecting the circuit configuration for the control circuit according to the operational mode of the switched mode power supply.

24. The computer program of claim 21, wherein the operating environment comprises a supply voltage mode of the switched mode power supply, the program further causing a processor to perform:
determining the supply voltage mode of the switched mode power supply; and
selecting the circuit configuration for the control circuit according to the supply voltage mode of the switched mode power supply.

25. The computer program of claim 21, further causing a processor to perform:
defining at least one of a gain and a frequency response of the feedback control circuit with the selection of the configuration of the feedback control circuit.

26. The computer program of claim 21, wherein the control circuit includes a feed-forward control circuit arranged at a feed-forward line of the switched mode power supply, the program further causing a processor to perform:
selecting the circuit configuration for the feed-forward control circuit according to the operating environment of the switched mode power supply.

27. The computer program of claim 26, further causing a processor to perform:
defining one or more reference voltages used for controlling a voltage ramp generator of a duty cycle generator of the switched mode power supply with the selection of the configuration of the feed-forward control circuit.

* * * * *